June 7, 1932. W. T. REA 1,861,550
MOTOR GENERATOR REGULATOR SYSTEM
Filed June 25, 1929
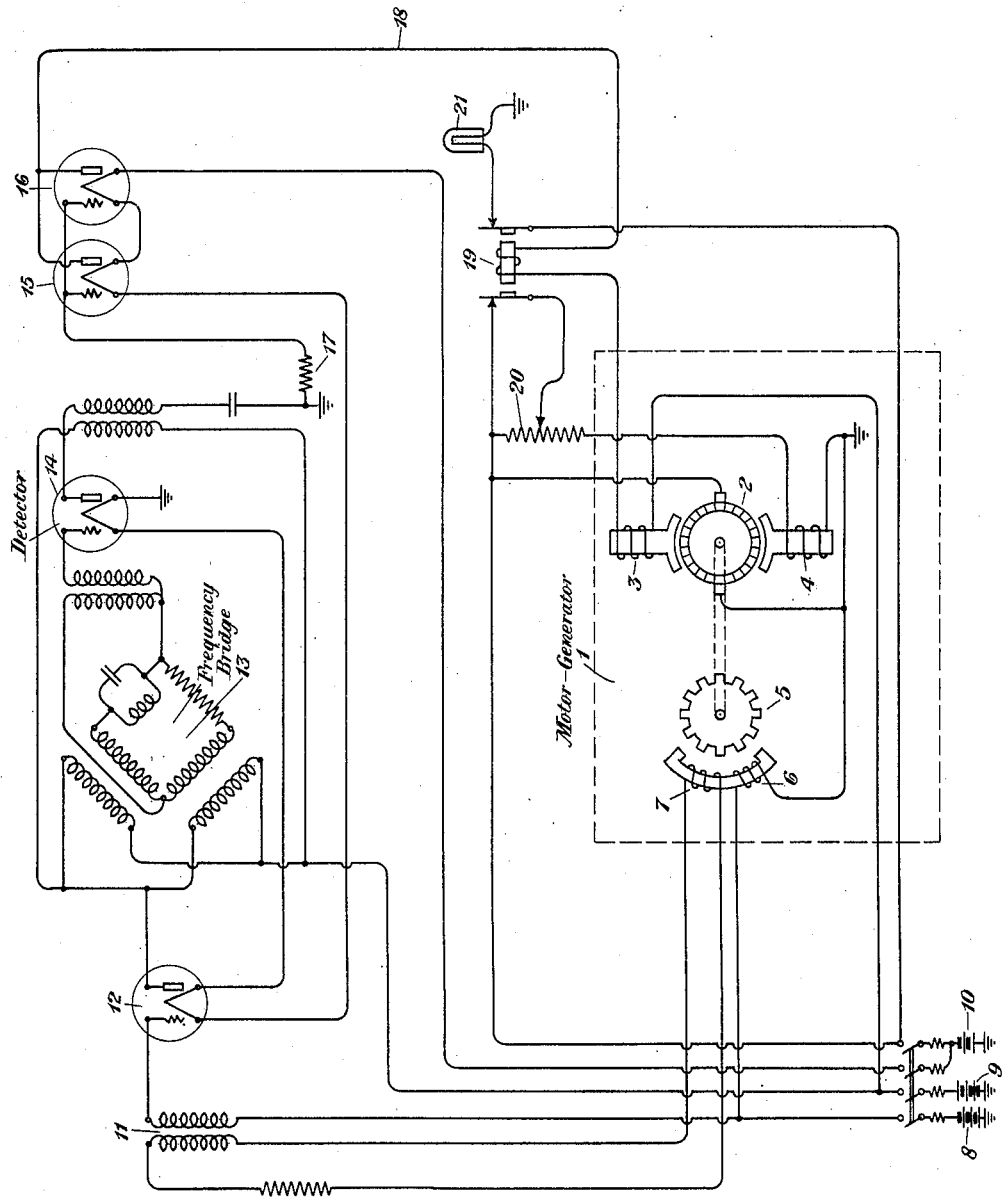
INVENTOR
W. T. Rea
BY William R. Ballard
ATTORNEY Patented June 7, 1932

1,861,550

UNITED STATES PATENT OFFICE

WILTON T. REA, OF FLUSHING, NEW YORK, ASSIGNOR TO AMERICAN TELEPHONE AND TELEGRAPH COMPANY, A CORPORATION OF NEW YORK

MOTOR-GENERATOR REGULATOR SYSTEM

Application filed June 25, 1929. Serial No. 373,663.

This invention relates to an improved type of regulator system for controlling the characteristics of a dynamo-electric device and more particularly to means for preventing the failure of operation of such a device upon any failure of operation of a portion of the regulator system.

In many cases, it is desirable to operate a motor at constant speed with close precision. As an example of a motor which must be operated at constant speed may be cited the motor for operating the carrier current generator in a voice frequency carrier current system. The speed of the motor in the above mentioned system must be held at a constant speed with precision in order to maintain the frequency of the generated current constant. One of the regulator systems utilized for controlling the speed of a motor generator device in systems of the above mentioned type employs thermionic vacuum tube circuits for controlling the field excitation of a motor to maintain the speed thereof constant. If any of the vacuum tubes in such a motor speed control system should fail, or if the plate or filament battery supply for such tubes should fail, the regulating field current for the motor would fail and the speed of the motor generator would begin to vary. In instances where the motor generator was utilized to supply the carrier current for a voice frequency carrier system, it is possible that as many as twenty 12-channel voice frequency systems might be put out of service for an appreciable period of time by the failure of a single vacuum tube or battery tap. Accordingly, it is one of the primary objects of this invention to provide arrangements whereby the speed of the motor will remain substantially constant and operative failure thereof will be prevented under conditions where apparatus, such as the vacuum tubes, in the control circuit may fail.

In the arrangements of this invention, relay means are provided in the regulator system in the circuit which leads to the regulating field winding of the motor. This relay will normally be held operative by the current supplied from the regulator system to the regulating field winding and will hold open a short circuit about a resistance in the circuit of the shunt field winding of the motor. If the speed regulator circuit should fail to operate or function properly, this relay will release and short-circuit enough of the shunt field resistance to increase the magnetic effect of the shunt field to be approximately equal to the added effects of the shunt field and regulating field when the speed regulator circuit was operating properly. The net effect will be that the motor generator will continue to run at approximately the same speed as before the failure of the speed regulator system occurred. Other objects and features of the invention will appear more fully from the detailed description thereof hereinafter given.

The invention may be more fully understood from the following description together with the accompanying drawing in the figure of which is shown a circuit diagram embodying a preferred form of the invention.

In the drawing is shown a motor generator system 1. The motor generator comprises a motor 2 having a regulating field winding 3 and a shunt field winding 4. The motor drives an alternating current generator 5 of the inductor type. This generator includes a generating field winding 6 and an armature winding 7. The batteries 8, 9 and 10 are provided for supplying current to the various windings of the motor generator device.

The armature winding 7 is connected to the winding of a transformer 11. Transformer 11 is connected to an amplifying tube 12. The output circuit of the amplifier 12 is connected to a Wheatstone bridge arrangement 13 having one arm thereof in the form of a tuned circuit. The anti-resonant arm of the bridge circuit is tuned to the frequency developed by the generator when the motor is operated at normal speed. A phase detector device 14 is provided and has an alternating current potential impressed on the grid thereof from the bridge circuit and an alternating potential impressed upon the plate thereof from the amplifier 12. The phase relation of the potentials impressed on the grid of the phase detector tube 14 varies with respect to the potentials impressed on the plate of such tube according to the frequency of the current produced by the generator 5. The phase detector tube 14 is coupled to the regulating tubes 15 and 16 which in turn are connected to a circuit including the regulating field winding 3 of the motor.

If the motor 2 tends to increase in speed, the generator 5 is operated to raise the frequency of the generated current. The frequency bridge circuit 13 varies the phase relation of the potential impressed upon the grid of the phase detector 14 with respect to the potential impressed upon the plate of such tube to lower the output from the phase detector tube 14. This lowers the potential drop across the coupling resistance 17 to increase the output from the regulator amplifier tubes 15 and 16. The increased output from the regulator tubes increases the current flow through the regulating field winding 3 to oppose the tendency of the motor to increase in speed. If the speed of the motor tends to decrease, a reverse action will take place in the vacuum tube circuits to decrease the current flow through the regulating field winding and hence allow the motor to increase in speed.

The above arrangements for controlling or regulating the speed of a motor generator device are well known and no further description thereof will be given. It is pointed out that in such arrangements, if any of the vacuum tubes such as 12, 14, 15 or 16 should fail or if their plate or filament battery supply should fail, the current through the regulating field winding 3 would be reduced to zero and the motor generator would gain in speed so as to be commercially inoperative, particularly in instances where it is utilized in a voice frequency carrier current system.

Accordingly, the arrangements of this invention provide in the output circuit 18 of the regulator tubes 15 and 16 a relay 19. This relay is held operated while the speed regulating circuit is functioning and holds open a normally closed short circuit about a portion of a resistance 20 connected in series with the shunt field winding 4 of the motor. If for any reason the regulating circuit including the vacuum tubes should fail, relay 19 will release. This will short-circuit enough of the resistance 20 connected to the shunt field winding 4 to so increase the current through the shunt field winding as to cause the magnetic effect of the shunt field to be approximately equal to the added effects of the shunt field and regulating field windings when the speed regulating circuit was operating properly. The net effect will then be that the motor generator will continue to run at approximately the same speed as before the failure of the speed regulator circuit occurred. Obviously, the speed will vary slightly with variations of load and motor supply voltage but will generally remain constant enough to supply carrier current to the voice frequency systems long enough for the regulating circuit to be restored or for an attendant to switch to another motor generator. An alarm circuit 21 is also operated by the release of relay 19 to give notification that the speed regulating circuit has failed.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. In a speed regulator system, a motor having a regulating field winding and a shunt field winding, a regulator circuit for controlling the excitation of said regulating field winding to maintain the motor speed constant, and means responsive to a failure of said speed regulator circuit for causing the magnetic effect of said shunt field winding to be approximately equal to the added effects of the shunt field and regulating field windings when said regulator circuit was in operation.

2. In a speed regulator system, a motor having a regulating field winding and a shunt field winding, a generator operated by said motor, a resistance in circuit with said shunt field winding, a regulator circuit including a plurality of vacuum tubes connected to said generator and to said regulating field winding of said motor whereby the speed of said motor may be maintained constant, and means included in said regulator circuit and responsive to a failure thereof for decreasing the resistance in circuit with said shunt field winding, said decrease in resistance being such that the flux of said shunt field winding is increased by substantially the same amount that the flux of said regulating field winding is decreased by reason of the failure of said regulator circuit.

3. In a frequency regulating system, a motor having a regulating field winding and a shunt field winding, a generator operated by said motor, a regulator circuit controlled by the frequency of the generator current for controlling the excitation of said regulating field winding to maintain the motor speed constant, and means included in said regulator circuit and responsive to a failure thereof for maintaining the speed of said motor substantially the same as before the failure of said regulator circuit.

4. In a speed regulator system, a motor having a regulating field winding and a shunt field winding, a regulator circuit including a frequency bridge and a phase detector for controlling the excitation of said regulating field winding to maintain the speed of the motor constant, and means responsive to the failure of said regulator circuit for maintaining the speed of said motor substantially the same as before the failure of said regulator circuit.

In testimony whereof, I have signed my name to this specification this 24th day of June, 1929.

WILTON T. REA.